US007283020B2

(12) United States Patent
Kauhanen

(10) Patent No.: US 7,283,020 B2
(45) Date of Patent: Oct. 16, 2007

(54) SIGNAL EXTRACTING ARRANGEMENT

(75) Inventor: Jouni Kauhanen, Oulu (FI)

(73) Assignee: Nokia Corporation, Espoo (FI)

( * ) Notice: Subject to any disclaimer, the term of this patent is extended or adjusted under 35 U.S.C. 154(b) by 662 days.

(21) Appl. No.: 10/461,998

(22) Filed: Jun. 13, 2003

(65) Prior Publication Data

US 2004/0176110 A1 Sep. 9, 2004

Related U.S. Application Data

(60) Provisional application No. 60/451,251, filed on Mar. 4, 2003.

(51) Int. Cl.

| | |
|---|---|
| *H01P 1/18* | (2006.01) |
| *H01P 3/00* | (2006.01) |
| *H01P 9/00* | (2006.01) |
| *H04B 3/36* | (2006.01) |
| *H04B 3/58* | (2006.01) |
| *H04B 7/14* | (2006.01) |
| *H04B 1/38* | (2006.01) |

(52) U.S. Cl. ..................... 333/160; 333/115; 333/206; 333/81 A; 333/222; 455/14; 455/561

(58) Field of Classification Search ................. 455/14, 455/561; 333/115, 24 R See application file for complete search history.

(56) References Cited

U.S. PATENT DOCUMENTS

| | | | | |
|---|---|---|---|---|
| 4,445,100 | A * | 4/1984 | Decker | 333/207 |
| 5,537,637 | A * | 7/1996 | Sugita et al. | 455/14 |
| 5,603,080 | A * | 2/1997 | Kallander et al. | 455/14 |
| 5,945,634 | A * | 8/1999 | Shimirak et al. | 174/71 C |
| 5,994,977 | A * | 11/1999 | Taya | 333/111 |
| 6,839,644 | B1 * | 1/2005 | Woods et al. | 702/56 |
| 6,876,854 | B1 * | 4/2005 | Ferray | 455/443 |
| 6,885,846 | B1 * | 4/2005 | Panasik et al. | 455/41.2 |
| 2002/0187809 | A1 * | 12/2002 | Mani et al. | 455/561 |
| 2003/0190932 | A1 * | 10/2003 | Pulkkinen et al. | 455/561 |

* cited by examiner

*Primary Examiner*—Ahmad F. Matar
*Assistant Examiner*—Aamir Haq
(74) *Attorney, Agent, or Firm*—Squire, Sanders & Dempsey L.L.P.

(57) ABSTRACT

A base station in a mobile communication network, includes at least one transmission line for transmitting a radio frequency signal. Each transmission line includes a coupling hole. A two-port coupled line includes one or more coupling holes. Each transmission line and the coupled line are couplable to form a coupling by setting the coupling hole of the transmission line against the coupling hole of the two-port coupled line. The coupling enables a signal sample of the radio frequency signal to propagate from the transmission line to the two-port coupled line.

25 Claims, 3 Drawing Sheets

SIGNAL EXTRACTING ARRANGEMENT

CROSS-REFERENCE TO RELATED APPLICATIONS

This application claims priority of U.S. Provisional Patent Application Ser. No. 60/451,251, entitled "Signal Extracting Arrangement," filed on Mar. 4, 2003, the entire contents of which are hereby incorporated herein by reference.

BACKGROUND OF THE INVENTION

1. Field of the Invention

The invention relates to an arrangement for taking a signal sample from a radio frequency (RF) signal.

2. Description of the Related Art

In base stations of mobile networks, a sample of a transmission signal can be needed for testing purposes, for instance. A signal extraction can also be needed in the implementation of a mobile terminal locating service. The service can be based on triangular measurements, where the mobile terminal monitors pilot signals from at least three base stations. Locating of the terminal can be based on known information on exact locations of the base stations, receiving moments of the signals transmitted from different base stations, and transmission moments of the signals. To find out exact transmission moments of the signals at the base stations, an extraction of the transmission signals can be taken.

An extraction can be taken from a signal by a directional coupler, for instance. The directional coupler, however, is a costly solution and it has a certain resistance, thereby lowering the power of the signal from which the extraction is taken. Another solution for taking a sample of a signal is a radio frequency probe, which is injected into the transmission line.

Prior art solutions have the significant disadvantage that they are not suited for serial handling when signal samples are needed from more than one transmission line. For instance, in a base station, a signal sample is often needed from transmission lines that lead to different transmission antennas. In the prior art solutions, in order to jointly handle these signals, a sampler is needed for each transmission line and a combiner for combining the obtained samples.

SUMMARY OF THE INVENTION

The invention is directed to an improved solution for taking a signal extraction in a base station of a telecommunication network. This is achieved with a base station in a mobile communication network, including at least one transmission line for transmitting a radio frequency signal. Each of the transmission lines has a coupling hole. A two-port coupled line includes one or more coupling holes. Each transmission line and the coupled line are couplable to form a coupling by setting the coupling hole of the transmission line against the coupling hole of the two-port coupled line. The coupling enables a signal sample of the radio frequency signal to propagate from the transmission line to the two-port coupled line.

The invention thus relates to an arrangement for taking a signal sample from a radio frequency signal. In one example of the invention, a two-port coupled line can be coupled to one or more transmission lines. Coupling between the coupled line and the transmission lines is implemented with coupling holes in both of the lines, which holes are positioned against each other so that a portion of the radio frequency signal can propagate via the coupling to the two-port coupled line.

In one embodiment, the coupling holes are provided in connectors that are used for connecting line portions with each other. For instance, two transmission line portions can be connected with each other by a connector.

In another embodiment, the invention is used in association with a Location Measurement Unit (the LMU) in a base station of a mobile telephony network in conjunction with an Enhanced Observed Time Difference (E-OTD) method. A signal extraction taken according to the invention can also be utilized in a Time Difference of Arrival (TDOA) method.

In one embodiment of the invention, one port of the two-port line can be connected to the LMU and one end can be closed by means of a resistor, for instance. The transmission lines can transport information to different transmission antennas in a base station, the transmission antennas transmitting to different base station sectors. In this embodiment, the invention enables a signal sample or portion or extraction from each of the transmission lines to be transmitted to the LMU. The transmission in transmission lines occurs in frames where each frame contains a unique frame identity. The frames can belong to uplink or downlink transmission. The LMU finds out frame identities from each of the received signal samples. The LMU can also be provided with a Global Positioning System (GPS) clock, and thus the LMU can associate each frame with a time stamp. The LMU then sends the frame identities and the relating time stamps to a Serving Location Mobile Center (SLMC). SLMC collects information from several base stations and/or a mobile station and can use the received information in locating the mobile station. The LMU can be used in synchronizing base stations.

The LMU requires a significantly attenuated signal portion compared to the RF signal transmitted in the transmission line and, therefore, by adjusting the size of the coupling holes properly, a desired 70-90 dB attenuation level of the transmission signal can be obtained. If the lines are coaxial cables, the attenuation also depends also on the distance between the lines, that is, the thickness of the outer conductors. The coupling holes can be equal-sized circles, for instance.

The two-port coupled line and the transmission line(s) can be coaxial cables, thus the coupling hole being implemented into the outer connector of the coaxial cable. The coupling hole then enables the RF signal to propagate from the conducting space between the conductors to the two-port coupled line.

The invention provides an inexpensive and simple solution for taking samples from radio frequency signals transmitted in one or more transmission lines in a base station of a mobile network.

BRIEF DESCRIPTION OF THE DRAWINGS

For proper understanding of the invention, reference should be made to the accompanying drawings, wherein.

DETAILED DESCRIPTION OF THE PREFERRED EMBODIMENTS

Figure 1:
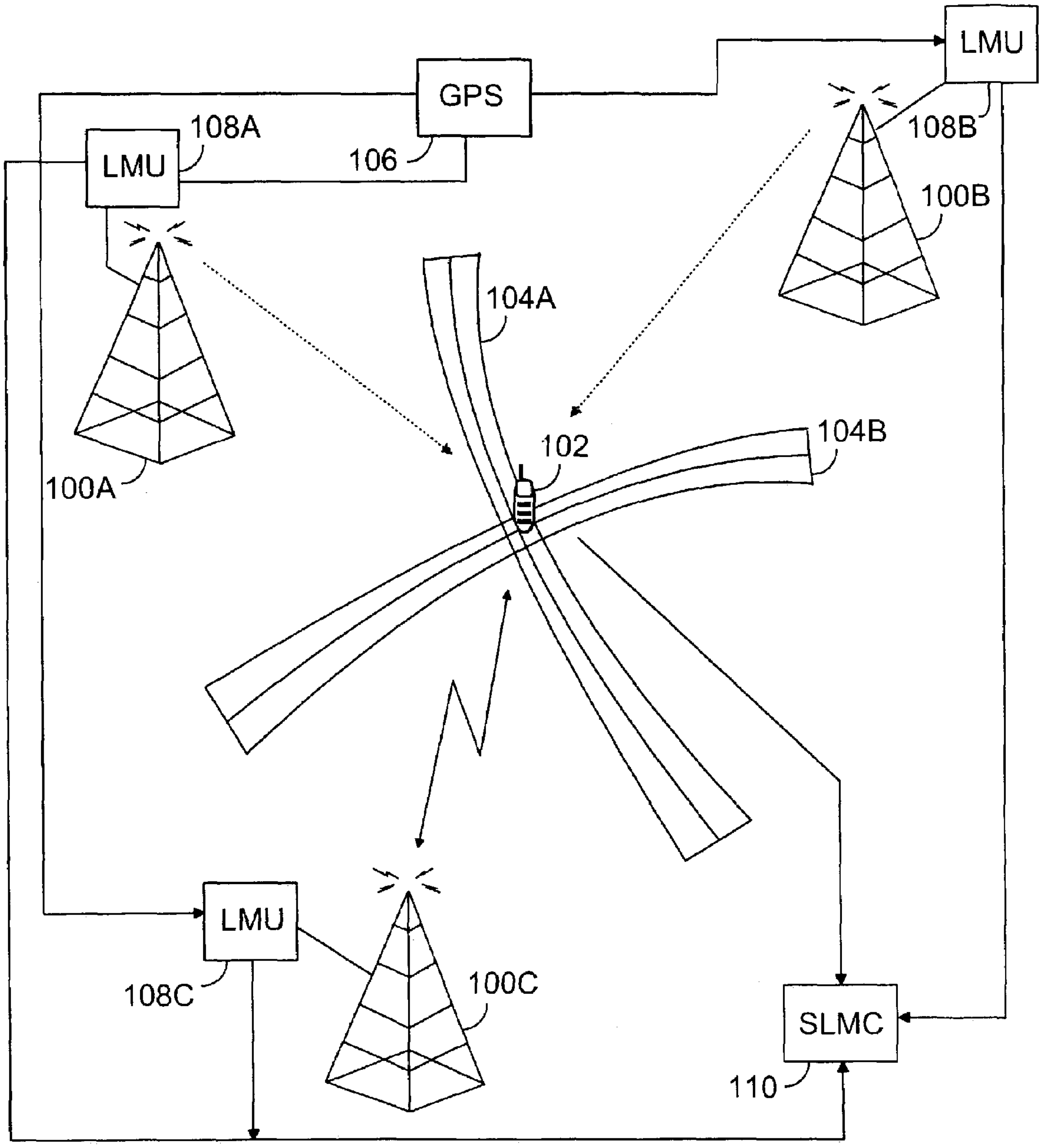
FIG. 1 shows one embodiment of a mobile telecommunications network.

FIG. 1 illustrates one example of a mobile network, which enables the location of a mobile station 102, such as a mobile phone, to be determined. In FIG. 1, Global System for Mobile communication (GSM) is used as an example of the mobile network. The mobile station of FIG. 1 belongs to the audibility areas of three base stations 100A to 100C, and base station 100C is the serving base station of the mobile station 102. In the GSM system, the network is often unsynchronised, and when a mobile station connects to a base station, the mobile station must synchronize with the base station. The network can also be synchronized, but even then synchronization is needed because the base station RF transmission can drift in time in comparison to the synchronized clock of the base station. Therefore, when synchronizing with a base station, the best result is obtained by measuring the actual RF transmission moment of the base station. The synchronization is performed using synchronization bursts that are regularly transmitted by the base stations. Arrows from base stations 100A and 100B to the mobile station 102 illustrate that the mobile station 102 can listen to the synchronization bursts also from base stations 100A and 100B other than the serving base station 100C. Synchronization information on neighboring base stations 100A and 100B is also needed if the mobile station 102 has to perform a handover to one of these neighboring base stations 100A or 100B from the serving base station 100C.

Each of the base stations 100A to 100C in FIG. 1 is equipped with a location measurement unit (the LMU) 108A to 108C. The location measurement unit can be an integrated part of the respective base station. The location measurement unit monitors base stations Broadcast Control Channel (BCCH) that contains a synchronization burst. The LMU can monitor signals to be transmitted already in the transmission chain before the signal has reached the transmission antenna of the base station. Besides the LMU being an integrated part of the base station, the LMU can also be placed outside a base station and be equipped with a receiving antenna of its own. For instance, the LMU 108C could in that case listen to radio signals transmitted from all base stations 108A to 108C. In such an LMU configuration, there does not necessarily have to be an LMU per each base station but, there could be an LMU per, for example, three base stations, or any plurality for instance.

FIG. 1 shows a GPS satellite 106 that gives exact time information to all the LMUs 108A to 108C. A triangular location determination system is based on time stamps taken on synchronization frames transmitted by base stations 100A to 100C. For instance, when a frame is to be transmitted by the base station 100A, the LMU 108A takes a GPS time stamp and an identity of the frame to be transmitted. The LMU 108A transmits the identity together with the time stamp to a serving location mobile center SLMC 110. Similarly, the LMUs 108B and 108C transmit timing and identity information from base stations 100B and 100C, respectively. When the mobile station 102 receives synchronization frames from base stations 100A to 100C, the mobile extracts the receiving moment and the frame identity and transmits these to SLMC 110. SLMC can calculate the location of the mobile station 102 by using transmission moments of the synchronization bursts from different base stations, time differences of the bursts from different base stations when received at the mobile, and location information of the base stations. The basic equation for the E-OTD method is shown in equation (1)

$$OTD=RTD+GTD \tag{1}$$

where OTD stands for Observed Time Difference between bursts from two base stations measured by the mobile. RTD, Real Time Difference, is the synchronization difference between base stations, that is, the relative difference in transmission times of their bursts. GTD, Geometrical Time Difference, is due to different propagation times or distances between the mobile and two base stations. GTD includes, as illustrated by equation (2), information on the relative location between the base stations and the mobile.

$$GTD=[d(MS, BTS1)-d(MS, BTS2)]/c, \tag{2}$$

where d is the distance between the mobile (MS) and the base station (BTSx), and c is the speed of the radio waves. As the result, the calculation gives as a result two hyperbolic areas 104A and 104B of which the area 104A determines for instance an area between base stations 100A and 100B where the mobile station is most probably located. The location of the mobile station 102 is then to be determined to be at the crossing area of the two hyperbolic areas 104A and 104B.

Figure 2:
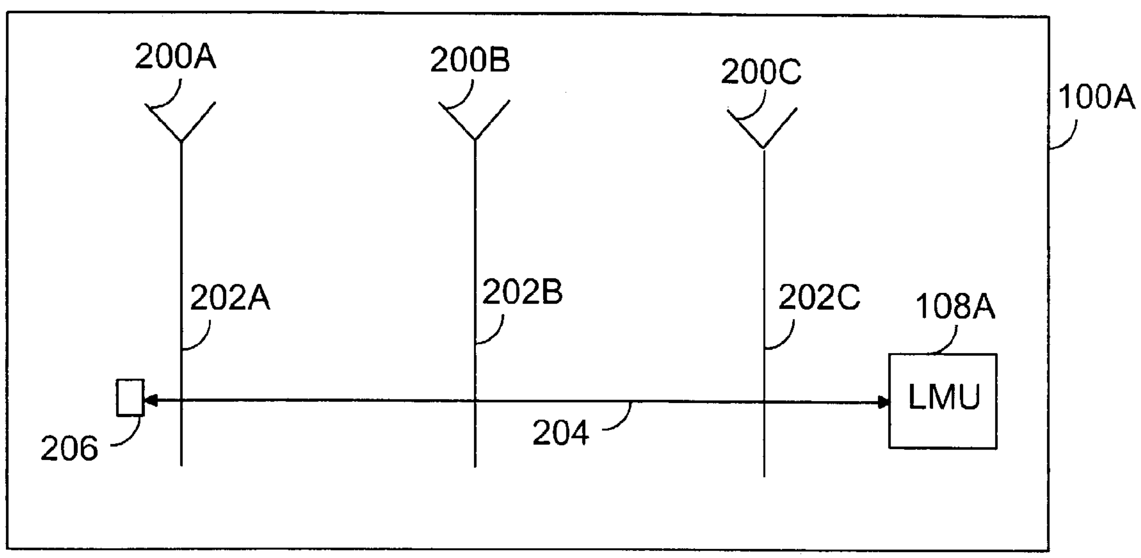
FIG. 2 illustrates one embodiment of an arrangement according to the invention.

FIG. 2 shows an example of how the solution according to the invention can be used. The base station 100A includes three transmission antennas 200A to 200C transmitting to different sectors of the base station. Each of the transmission antennas 200A to 200C is coupled to a respective transmission line 202A to 202C for transmitting a radio frequency signal to the antenna. The RF signal transmission is arranged into frames where each of the frames contains a frame identity for identifying the frame. Each of the transmission lines 202A to 202C is coupled to a coupled line 204. The number of transmission lines to be coupled to the coupled line 204 is not limited, and there can be one or more transmission lines coupled to the coupled line.

The coupled line 204 can have two ports, that is, a signal in the coupled line can move towards each of the ends of the coupled line. For instance, a portion of the electromagnetic signal propagating in line 202B is extracted in the coupling of lines 202B and 204, and the extracted portion is free to propagate to each direction in the coupled line 204. Thus, one portion of the signal can propagate to the left in FIG. 2, where at the first port of the coupled line 204 there can be a resistor 206 that efficiently attenuates the signal so that it does not reflect back to the right along the coupled line anymore. The resistor can be a 50-ohm RF resistor, for instance. At the second port of the coupled line there can be coupled an LMU 108A.

Alternatively, instead of connecting a resistor to one port of the two-port coupled line, an external antenna can be connected to the coupled line 204. Then, signal extractions from the transmission lines 202A to 202C in their own base station could be obtained via the couplings between the transmission lines and the coupled line 204. Signals from other base stations could then be received via the receiving antenna at one port of the coupled line. Signals from their own base station and other base stations are received in the LMU that is coupled to one port of the coupled line 204. It is possible that the signals from their own base station are received via the couplings and also via the external antenna. However, the signal received via the couplings usually has a substantially higher power level such that no risk for interference exists.

Figure 3:
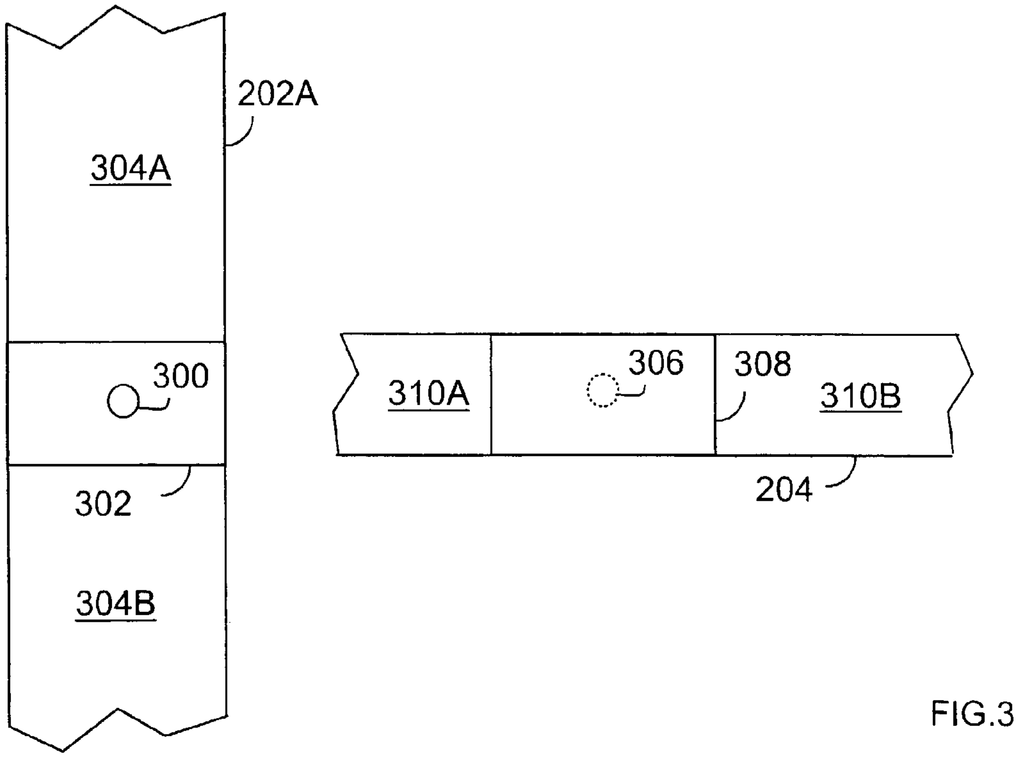
FIG. 3 illustrates one embodiment of a coupled line and a transmission line according to the invention.

FIG. 3 further illustrates the transmission line 202A and the coupled line 204. The transmission line 202A includes a first coupling hole 300, which enables a portion of the electromagnetic signal transmitted in the transmission line to propagate out of the transmission line. In one embodiment, the transmission line 202A is joined from two or more sections. FIG. 3 shows two sections 304A and 304B, which are joined with a connecting element 302. In the embodiment of FIG. 3, the connecting hole 300 is provided in the connecting element 302. The connecting element 302 is not necessarily used for joining two sections of a transmission line together but the purpose for using the connecting element can be the connectability of the transmission line to the coupled line. The connecting hole 300 can be provided in the connecting element by mechanizing. The connecting element can be a 7/16 I-adapter, meaning that the diameter of the inner conductor is 7 mm and the diameter of the inside of the outer conductor is 16 mm. The connecting element can also be a so-called N-connector, or other suitable connector.

FIG. 3 also shows an embodiment of the coupled line 204. The coupled line 204 can also be formed of several sections, from which two, 310A and 310B, are shown. The sections are joined with a connecting element 308 and the connecting hole 306, the second connecting hole being provided in the connecting element 308. The first connecting hole 300 and the second connecting hole 306 that are set against each other can be of the equal size. The connectors 302 and 308 can be joined by soldering or welding, for instance. The connecting holes can be positioned in relation to each other by means of a positioning pin. Another possibility is to drill connecting holes in both of the connectors at the same time. If the through-drilling is done through the coupled line, the additional hole that is provided in the coupled line is closed by means of a plug. The connecting holes can also be drilled in both lines at the same time from the inside of either of the lines, using an angle drill.

Figure 4:
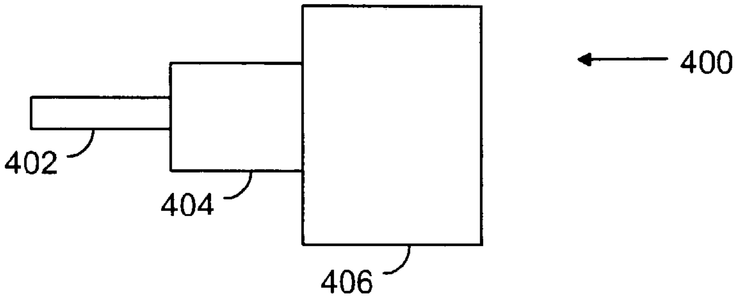
FIG. 4 illustrates a coaxial cable.

One possibility is to mold a connector that includes both the connector 302 of the transmission line 202A and the connector 308 of the coupled line 204. Such a connector could be made by molding, being readily attachable to a base station. When the connecting element is made by molding, the connecting holes can be made in the same molding/casting process. For the purposes of the LMU, the attenuation needed from the signal in the transmission line 202A compared to the signal in the coupled line 204 can be about 70-90 dB. The attenuation factor can be adjusted by adjusting the sizes of the connecting holes 300 and 306. The connecting holes can have a diameter in the range of 1 to 2 millimeters, for instance. The one or more transmission lines and/or the coupled line shown in FIGS. 2 and 3 can be coaxial cables, for instance. FIG. 4 illustrates one structure of a coaxial cable/line 400. The cable 400 contains an inner conductor 402, an outer conductor 406 and an insulator between said conductors. An electromagnetic wave propagates between the conductors.

The electrical characteristics of a coaxial cable are characterized by a variety of factors including surge impedance, velocity factor, attenuation and power handling capacity. The higher the impedance, the lower is the attenuation in an RF signal. Impedance depends on the ratio of the inner conductor's outside diameter to the outer conductor's inside diameter as well as on the material used in an insulating layer. An insulator 404, or an insulating layer can be air, for instance. However, in practice, the insulating layer is often, for mechanical reasons, made of some insulating material, such as Teflon, polyethylene or the like. The impedance is inversely affected by the dielectricity constant of the insulating layer. Besides impedance, dielectricity of the insulating layer also affects the speed of a signal transmitted in the cable. For polyethylene, the velocity factor is 66%, that is, polyethylene slows the signal to 66% of the speed of the light. The attenuation of the signal increases with the frequency of the signal. Attenuation can be reduced by pleating of conductors.

Figure 5:
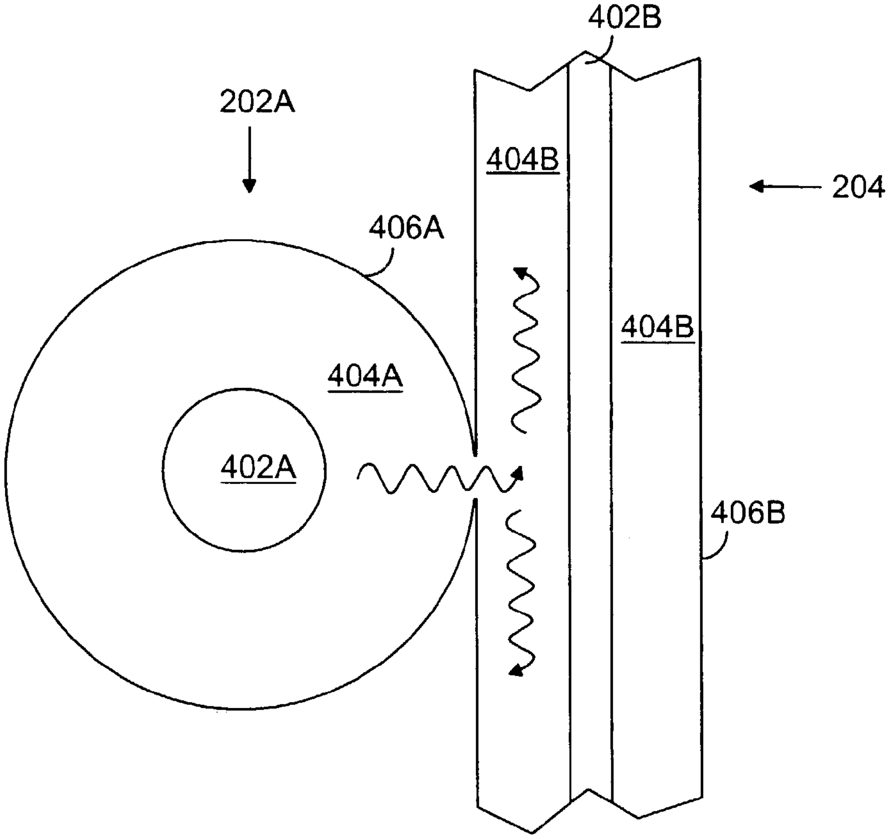
FIG. 5 illustrates one embodiment of a coupling according to the invention.

FIG. 5 shows a cross-section of one embodiment of a coupling arrangement according to the invention. The transmission line 202A coaxial cable can have an outer conductor 406A, an insulating layer 404A and an inner conductor 402A. The thickness of the outer conductor can be about 1 mm in a 7/16 adapter, for instance. The outer conductor's 406A diameter depends on the transmission requirements. Typically, the characteristic impedance of coaxial cables is 50 or 75 ohms. The characteristic impedance depends on the ratio of the outer conductor's 406A diameter to the inner conductor's 402A diameter, and on the relative permittivity of the insulating layer 404A between them.

The outer conductor of the transmission line 406A is provided with a coupling hole, through which an electromagnetic signal can propagate to a coupled line 204 that has a corresponding coupling hole. The electromagnetic signal extraction can propagate in the insulating layer 404B of the coupled line to both directions. The coupled line 204 can also be a coaxial line and includes thus an inner conductor 402B and an outer conductor 406B. In practice, the coaxial cables shown in FIG. 5 can also have a covering shield, which, for simplicity, is not shown in FIG. 5.

Besides the size of the connecting holes, the attenuation factor also depends on the depth of the connecting hole, that is, the distance from the inside of the inner conductor 406A to the inside of the outer conductor 406B. Thus, the depth of the connecting hole equals the sum of the thicknesses of the outer conductors and/or the connectors.

Even though the invention has been described above with reference to an example according to the accompanying drawings, it is clear that the invention is not restricted thereto but can be modified in several ways within the scope of the appended claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be clear to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A base station comprising:

at least one transmission line for transmitting a radio frequency signal, said at least one transmission line comprising a coupling hole; and a coupled line including one or more coupling holes, wherein said at least one transmission line and the coupled line are operatively coupled to form a coupling by setting the coupling hole of the at least one transmission line against the coupling hole of the coupled line, and wherein the coupling enables a signal sample of the radio frequency signal to propagate from the at least one transmission line to the coupled line, wherein a size of the coupling hole of the at least one transmission line and a size of the coupling hole of the coupled line are such that a power of the signal sample is 70-90 dB less than a power of the radio frequency signal transmitted in the at least one transmission line.

2. The base station of claim 1, wherein the at least one transmission line comprises a first connector for connecting two portions of the at least one transmission line together, wherein the coupling hole of the at least one transmission line is in the first connector of the at least one transmission line, and the coupled line comprises a second connector for connecting two portions of the coupled line together and wherein the coupling hole of the coupled line is in the second connector of the coupled line.

3. The base station of claim 1, further comprising a third connector having a first connecting hole for setting against the connecting hole of the at least one transmission line and a second connecting hole for setting against the coupling of the coupled line.

4. The base station of claim 1, wherein said at least one transmission line leads to a transmission antenna in the base station.

5. The base station of claim 4, wherein said at least one transmission line comprises at least two transmission lines leading to different transmission antennas the base station.

6. The base station of claim 1, further comprising a location measurement unit, and wherein one port of the coupled line is connected to the location measurement unit.

7. The base station of claim 6, wherein the radio frequency signal is transmitted in frames, and the location measurement unit includes an associating unit configured to associate a time stamp with a frame based on a received signal sample, the base station further comprising a transmitting unit configured to transmit time stamps of the frame to an external calculation unit, the calculation unit being configured to calculate a location of a mobile station by using time stamps of frames received from one or more base stations and the mobile station.

8. The base station of claim 1 wherein the coupled line includes a terminal resistor connected thereto.

9. The base station of claim 1, wherein the coupling hole of the at least one transmission line and the coupling hole of coupled line are equal-sized round holes.

10. The base station of claim 1, wherein the coupling hole of the at least one transmission line and the coupling hole of the coupled line have a diameter in the range of 1 to 2 millimeters.

11. The base station of claim 1, wherein the at least one transmission line and the coupled line comprise a coaxial cable, including an inner conductor and an outer conductor and a conducting layer of air between the inner conductor and the outer conductor, and wherein the coupling hole is a hole in the outer conductor leading to the conducting layer of air.

12. The base station of claim 11, wherein the thickness of the outer conductor in the at least one transmission line and the coupled line is such that a power of the signal sample is 70-90 dB less than a power of the radio frequency signal transmitted in the at least one transmission line.

13. The base station of claim 11, wherein the thickness of the outer conductor in the at least one transmission line is such that a power of the signal sample is 70-90 dB less than a power of the radio frequency signal transmitted in the at least one transmission line.

14. The base station of claim 11, wherein the thickness of the outer conductor in the coupled line is such that a power of the signal sample is 70-90 dB less than a power of the radio frequency signal transmitted in the at least one transmission line.

15. The base station of claim 1, wherein the at least one transmission line comprises a coaxial cable, including an inner conductor and an outer conductor and a conducting layer of air between the inner conductor and the outer conductor, and wherein the coupling hole comprises a hole in the outer conductor leading to the conducting layer of air.

16. The base station of claim 15, wherein the thickness of the outer conductor in the at least one transmission line is such that a power of the signal sample is 70-90 dB less than a power of the radio frequency signal transmitted in the transmission line.

17. The base station of claim 15, wherein the thickness of the outer conductor in the at least one transmission line is such that a power of the signal sample is 70-90 dB less than a power of the radio frequency signal transmitted in the at least one transmission line.

18. The base station of claim 15, wherein the thickness of the outer conductor in the coupled line is such that a power of the signal sample is 70-90 dB less than a power of the radio frequency signal transmitted in the at least one transmission line.

19. The base station of claim 1, wherein the coupled line comprises a coaxial cable, including an inner conductor and an outer conductor and a conducting layer of air between the inner conductor and the outer conductor, and wherein the coupling hole is a hole in the outer conductor leading to the conducting layer of air.

20. The base station of claim 1, wherein the coupled line comprises a two-port coupled line.

21. The base station of claim 20, wherein the coupled line includes a terminal resister connected to one of two ports.

22. A method comprising:

transmitting a radio frequency signal through at least one transmission line including a coupling hole, and a coupled line including one or more coupling holes;

forming a coupling by setting the coupling hole of the at least one transmission line against the coupling hole of the coupled line;

extracting a signal sample of the radio frequency signal by propagating the signal from the at least one transmission line to the coupled line through the coupling, wherein a size of the coupling hole of the at least one transmission line and a size of the coupling hole of the coupled line are such that a power of the signal sample is 70-90 dB less than a power of the radio frequency signal transmitted in the at least one transmission line.

23. The method of claim 22, wherein the propagating of the signal sample comprises propagating the signal to each direction of the coupled line.

24. The method of claim 22, wherein the coupling comprises coupling a two-port coupled line to the at least one transmission line.

25. A base station comprising:

transmitting means for transmitting a radio frequency signal through at least one transmission line including a coupling hole, and a coupled line including one or more coupling holes;

forming means for forming a coupling by setting the coupling hole of the at least one transmission line against the coupling hole of the coupled line;

propagating means for propagating a signal sample of the radio frequency signal from the at least one transmission line to the coupled line through the coupling; and extracting means for extracting a signal sample by extracting the signal at the coupling of the transmission line and the coupled line, wherein a size of the coupling hole of the at least one transmission line and a size of the coupling hole of the coupled line are such that a power of the signal sample is 70-90 dB less than a power of the radio frequency signal transmitted in the at least one transmission line.

* * * * *